(12) United States Patent
Andersson et al.

(10) Patent No.: US 9,102,077 B2
(45) Date of Patent: Aug. 11, 2015

(54) POWER CUTTER

(75) Inventors: Lars Andersson, Vastra Frolunda (SE); Ove Donnerdal, Savedalen (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 13/989,378

(22) PCT Filed: Dec. 22, 2010

(86) PCT No.: PCT/SE2010/051470
§ 371 (c)(1),
(2), (4) Date: May 23, 2013

(87) PCT Pub. No.: WO2012/070994
PCT Pub. Date: May 31, 2012

(65) Prior Publication Data
US 2013/0247896 A1  Sep. 26, 2013

Related U.S. Application Data

(63) Continuation of application No. PCT/SE2010/051289, filed on Nov. 23, 2010.

(51) Int. Cl.
*B24B 23/02* (2006.01)
*F02B 75/06* (2006.01)
*B28D 1/04* (2006.01)
(Continued)

(52) U.S. Cl.
CPC *B28D 1/04* (2013.01); *B23D 45/16* (2013.01); *B23D 47/12* (2013.01); *B25F 5/02* (2013.01); *F02B 63/02* (2013.01); *F16F 15/26* (2013.01);
(Continued)

(58) Field of Classification Search
CPC ............ B24B 23/02; B24B 23/00; B25F 5/00
USPC .................. 451/350, 358, 359; 125/13.01
See application file for complete search history.

(56) References Cited

U.S. PATENT DOCUMENTS 3,581,717 A  6/1971  Fullerton
4,836,297 A  6/1989  Dorner et al.
(Continued)

FOREIGN PATENT DOCUMENTS

DE  19722933 A1  12/1997
JP  11082009 A  3/1999
(Continued)

OTHER PUBLICATIONS

International Search Report for International Application No. PCT/SE2010/051470, dated Sep. 13, 2011.
(Continued)

*Primary Examiner* — Robert Rose
(74) *Attorney, Agent, or Firm* — Nelson Mullins Riley & Scarborough LLP

(57) ABSTRACT

A power cutter including a tool unit, an internal combustion engine having an engine cylinder with cylinder bore having a center line and an exhaust port formed in the engine cylinder, a crankshaft, crankcase and an assembly for supplying air and fuel to the engine, and a muffler accommodated in a close and side by side relationship with the engine cylinder, the muffler includes an exhaust gas inlet and an exhaust gas outlet, such that the exhaust gas inlet is adapted to receive the exhaust gases from an exhaust port of the engine cylinder, wherein the exhaust gas inlet is provided on the top or bottom or local side of the muffler.

20 Claims, 8 Drawing Sheets

(51) Int. Cl.
    *B23D 45/16*     (2006.01)
    *B23D 47/12*     (2006.01)
    *B25F 5/02*     (2006.01)
    *F02B 63/02*     (2006.01)
    *F16F 15/26*     (2006.01)
    *F01N 1/00*     (2006.01)

(52) U.S. Cl.
    CPC ............... *F01N 1/00* (2013.01); *F01N 2340/04* (2013.01); *F01N 2590/06* (2013.01); *F02B 75/06* (2013.01)

(56) References Cited

U.S. PATENT DOCUMENTS

| | | | |
|---|---|---|---|
| 5,259,269 | A | 11/1993 | Swenson |
| 6,152,092 | A | 11/2000 | Andreasson et al. |
| 7,520,276 | B2 * | 4/2009 | Jakobsson et al. ......... 125/13.01 |
| 2005/0191148 | A1 | 9/2005 | Schlessmann |
| 2010/0122674 | A1 | 5/2010 | Junginger |

FOREIGN PATENT DOCUMENTS

| | | |
|---|---|---|
| WO | 2012070989 A1 | 5/2012 |
| WO | 2012070994 A1 | 5/2012 |

OTHER PUBLICATIONS

International Preliminary Report on Patentability for International Application No. PCT/SE2010/051470, dated Feb. 5, 2013.

English Abstract of JP11082009 published Mar. 26, 1999; downloaded May 23, 2013.

English Translation of JP11082009; downloaded May 23, 2013.

International Search Report mailed Jul. 5, 2011; in corresponding PCT patent application No. PCT/SE2010/051289.

Written Opinion mailed Jul. 5, 2011; in corresponding PCT patent application No. PCT/SE2010/051289.

English abstract of DE19722933; published on Dec. 4, 1997 and retrieved on retrieved May 22, 2013.

\* cited by examiner

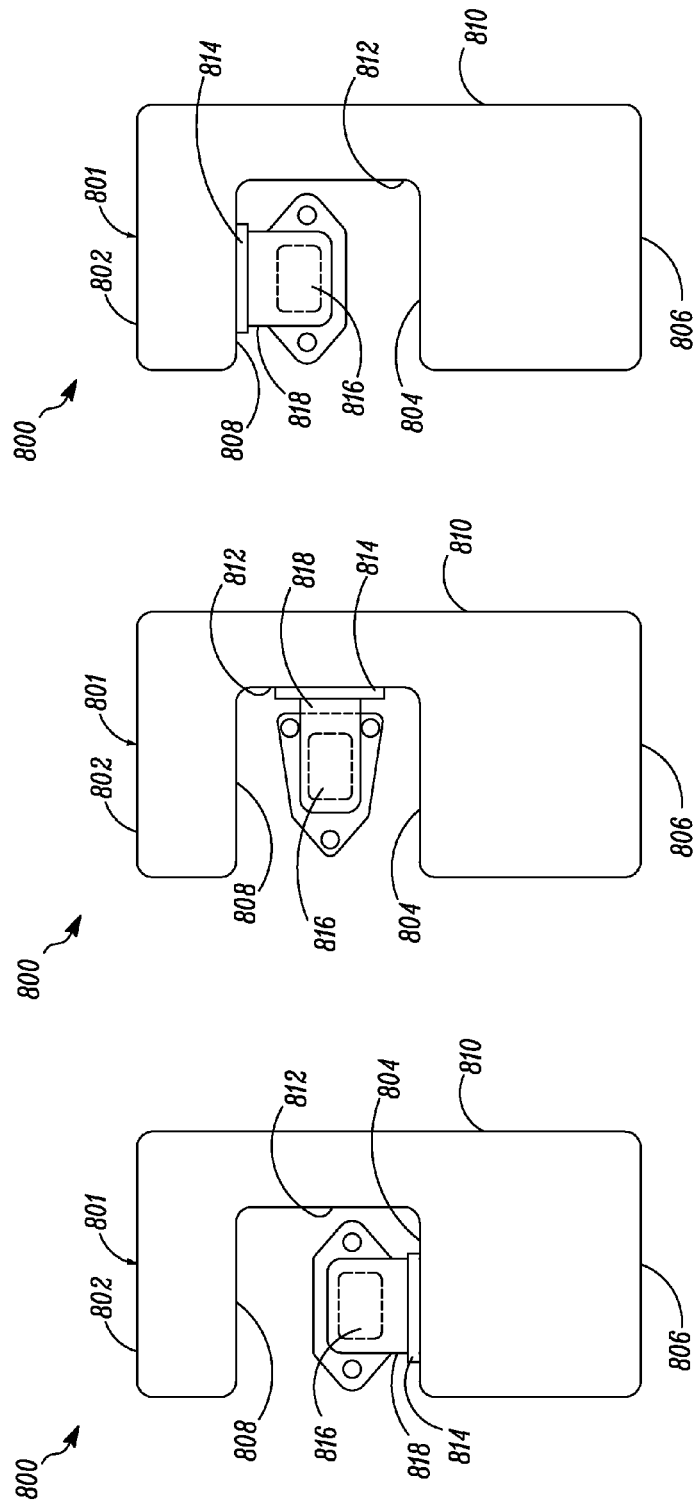

POWER CUTTER

CROSS-REFERENCE TO RELATED APPLICATIONS

This application is a national stage entry of PCT/SE2010/051470 filed Dec 22, 2010, which claims priority to PCT/SE2010/051289, which was filed on Nov. 23, 2010, said applications are expressly incorporated herein in its entirety.

TECHNICAL FIELD

The present invention relates to a portable, hand held power cutter powered by a single cylinder internal combustion engine. The power cutter comprising: a tool unit having at least one working tool, which can be rotated about an axis of rotation, and preferably having a tool guard;
a drive unit comprising a single cylinder internal combustion engine, the engine comprising a single engine cylinder with cylinder bore having a cylinder bore centerline and an exhaust port formed in the engine cylinder, a crankshaft, a crankcase and an assembly for supplying air and fuel to the engine;
a cutter arm attached to the drive unit in its inner end and its outer end carrying the tool unit; and
a muffler accommodated in a close and side by side relationship with the engine cylinder, i.e. not located above or below the engine cylinder; the muffler comprises an exhaust gas inlet and an exhaust gas outlet, such that the exhaust gas inlet is adapted to receive the exhaust gases from the exhaust port of the engine cylinder.

BACKGROUND OF THE INVENTION

Portable, hand-held power cutters powered by a single cylinder internal combustion engine are known since long. As well known in the art, a muffler is provided at the exhaust port of the engine for collecting the exhaust gases. Because of size and weight constraints such a hand held tool has small or even minimized cooling fins on the engine cylinder as well as a small/minimized cooling fan. Therefore the temperature in the cylinder is often near/at critical levels during hard use and the exhaust port area on the hot, front side of the cylinder is the most critical for heat damage to cylinder and piston. This temperature problem is even more marked if a catalyser is arranged in the muffler, that therefore will be even more hot and transfer heat to the exhaust port area. Other features like a delayed ignition, e.g. to prevent over revving in combination with ignition "cut out", will also create more heat in the muffler and in the exhaust port area of the cylinder, and especially if a post oxidation, or "after burn" is started in the muffler. This risk is also higher in a two stroke engine provided with additional air. Power cutters are especially problematic as their "cut out" speed is very close to their normal work speed, like only 2-15% above. An exhaust gas inlet is provided on the muffler to communicate with the exhaust port of the engine cylinder and finally the exhaust gases are released in the atmosphere via the outlet of the muffler. Primarily, the muffler is placed in close vicinity of the engine cylinder due to the space and size constraints in the handheld power cutter. During and after operation, a lot of heat is transferred from the inlet port of the muffler to the exhaust port and may increase the temperature at the exhaust port of the cylinder. The increase in temperature may result in engine damage and failure. These machines are often used for cutting concrete and similar materials. Such a cutting creates a lot of abrasive particulate matter. Typically, efficient air cleaning is vital and is attained mainly through a filter assembly having a big filter volume, which may increase the service life of the machine. To create a big filter volume in a compact machine, power cutters have been introduced which have an engine cylinder which is leaned forwards. An example is Husqvarna K 750 and K760. This design is described in U.S. Pat. No. 7,520,276, assigned to Husqvarna AB and the disclosure of which is hereby incorporated by reference in this application. This kind of design layout has a forward leaning cylinder with a tilt angle ($\alpha$) that is between 5 degrees and 40 degrees in contrast to a more traditional design with a backwards leaning cylinder, i.e. with a negative tilt angle. Further the cutter arm points more upwards than in a traditional design. These differences contributes in creating an acute angle between the cutter arm centerline and the cylinder bore centerline, and this acute angle is larger than 45° but smaller than 75°. It is typically 55°-60°, compared to 80°-100° for a more traditional design. So this design enables a compact and light power cutter with a very good air cleaning. However, when built in this compact design with the muffler partly below the cylinder, the engine tends to be somewhat hotter than in a more traditional design.

U.S. Pat. No. 7,389,853 issued on Jun. 24, 2008 and assigned to Briggs & Stratton Corporation, describe a muffler disposed above the cylinder of the engine. As described in the U.S. Pat. No. 7,389,853, the muffler is provided with a pipe which attaches the inlet of the muffler to the exhaust port of the engine cylinder. Further, U.S. Pat. No. 6,250,422 issued on Jun. 26, 2001 and assigned to Nelson Industries, also discloses a similar muffler construction and a similar engine-muffler configuration, where the muffler is intended to be disposed above the engine. If using a layout with a muffler disposed above the cylinder it is extremely difficult to achieve a compact configuration for the handheld power cutter, and the result would also be a high cutter with a high center of gravity, which would be very negative for a hand held power cutter.

Therefore there is a need for a muffler construction and engine-muffler arrangement to protect the engine from damages due to overheating and also provided a compact configuration of the handheld power cutter.

BRIEF DISCLOSURE OF THE INVENTION

Therefore there is a need for a muffler construction and engine-muffler arrangement to protect the engine from damages due to overheating and also provided a compact configuration of the handheld power cutter. The objective is achieved with a novel, portable, hand-held power cutter, powered by a single cylinder internal combustion engine, according to claim 1. The power cutter includes a muffler placed closely to the engine cylinder in a side by side relationship. A pipe is disposed between the exhaust port of the engine cylinder and the inlet of the muffler. Since the exhaust port and the muffler are separated by the pipe the heat transfer from the muffler to the exhaust port is reduced considerably. Further, the pipe is also exposed to the cooling ambient air provided by the cooling fan, which facilitates the reduction of temperature of the exhaust gases. Similarly the exhaust port of the cylinder is better exposed to the cooling air because of the small pipe that does restrict air flow much less than a directly attached muffler.

According to claim 2 the cylinder bore is inclined in a forward direction towards the tool unit, such that the centre line of the cylinder bore forms a tilt angle ($\alpha$) larger than zero to a base line perpendicular being perpendicular to a base line which is a line coinciding with a horizontal surface on which the power tool is resting in an upright position.

According to claim 3 the connection line or a parallel line forming a cylinder angle β with the cylinder bore centerline, and this cylinder angle β is larger than 45°, but smaller than 75°.

According to claim 2, when the power tool is placed in an upright position on a horizontal surface the centerline of the engine cylinder is inclined at an angle with a vertical direction. Further according to claim 3, the inclined angle may vary form about 5 degrees to about 40 degrees. In this configuration a triangular space is left between the cylinder and the tool unit.

According to claim 4, the muffler is placed in the triangular space left between the inclined engine cylinder and the tool unit. By placing the muffler in the triangular space it is possible to divert cooling ambient air over the muffler for temperature reduction. Further, the pipe is disposed between the exhaust port of the engine cylinder and the inlet of the muffler may also cool by the ambient air and reduce heat transfer to the cylinder.

According to claim 5, the pipe may be integrated with inlet of the muffler and is fastened to the exhaust port by means of a plurality of fasteners or by means of welding. Further, according to claim 6, the pipe may be integrated to the exhaust port and fastened to the inlet of the muffler by means of a plurality of fasteners or by means of welding. Alternatively, according to claim 7, the pipe may be fastened to both the exhaust port and the inlet of the muffler by means of fasteners or by means of welding.

According to claim 8, the pipe may be extended to proceed inside the muffler. Further, according to claim 9, the outer surface of the pipe may be provided with cooling fins for enhancing a heat transfer to the ambient air. According to claim 10, a baffle may be provided either on the upper or the lower surface of the muffler. The baffle may direct the flow of the ambient air in a sideway direction over the pipe and helps expedite the cooling of the pipe.

According to claim 11, the muffler may be provided with a catalytic converter. The catalytic converter may help to reduce an emission level from the exhaust gases.

Other aspects, achievements and characteristic features of the invention are apparent from the appending claims and from the following description of preferred embodiments of the invention.

BRIEF DESCRIPTION OF THE DRAWINGS

In the following description of preferred embodiments, reference will be made to the accompanying drawings, in which.

FIG. 8A shows the muffler and the cylinder-muffler arrangement according to a yet another embodiment of the present invention;

FIG. 8B shows the muffler and the cylinder-muffler arrangement according to a yet another embodiment of the present invention; and FIG. 8C shows the muffler and the cylinder-muffler arrangement according to a yet another embodiment of the present invention.

DESCRIPTION OF PREFERRED EMBODIMENTS

Figure 1:
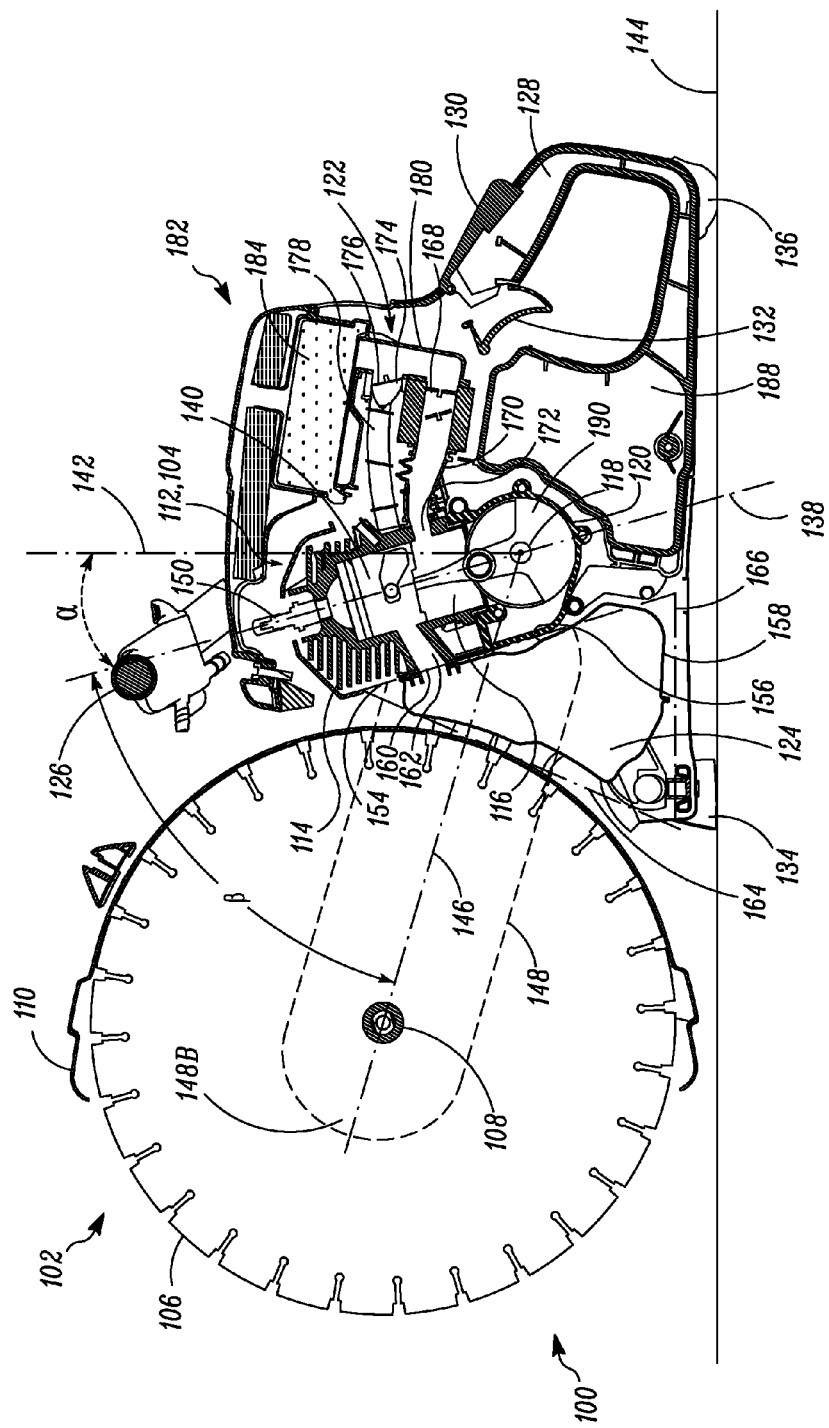
FIG. 1 shows a longitudinal cross-section of a power cutter having a forward leaning engine cylinder.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

Figure 2:
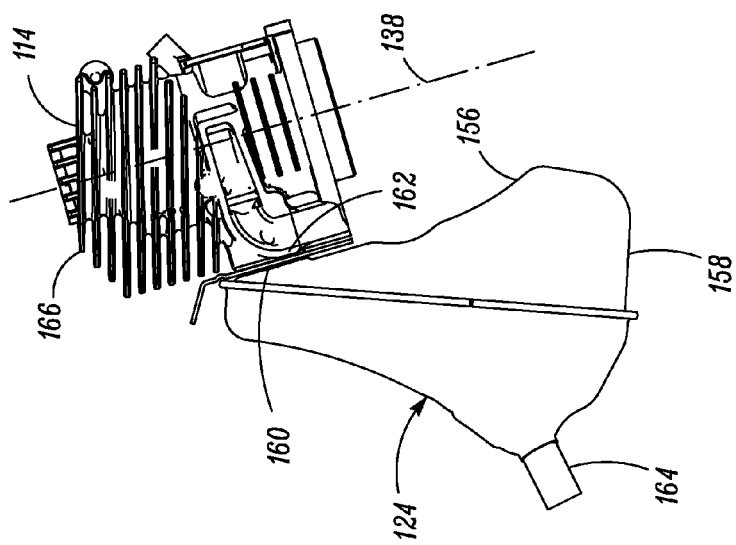
FIG. 2 shows a state of the art muffler and the cylinder-muffler arrangement in an exemplary hand-held power tool.

FIGS. 1 and 2 show a portable hand-held power cutter 100 with a forward leaning single cylinder and a directly attached muffler.

The power cutter 100 includes a tool unit 102 and a drive unit 104. The tool unit 100 is provided with a working tool 106. The working tool 106 may be a cutter disc with attached segments with diamonds to aid in a cutting of hard or abrasive materials. The working tool 106 is rotated about an axis of rotation 108 which may be perpendicular to the plane of the paper in the normal upraised position of the machine, as shown in FIG. 1. It is also possible to use two cutting discs located close to each other, to be used in a cut and break method, as described in U.S. Pat. No. 7,571,720, assigned to Husqvarna AB and the disclosure of which is hereby incorporated by reference in this application. Further, the tool unit 102 may also include a tool guard 110 in a conventional manner.

Further the drive unit 104 includes a two-stroke internal combustion engine 112 with an engine cylinder 114 with a cylinder bore 116, a crankshaft 118 and a crankcase 120, an assembly 122 for supplying air and fuel mixture to the engine, a muffler 124 and a flywheel 152. A cooling fan is arranged in a conventional way arranged as a radial fan with wings arranged on the flywheel. This is arranged in a fully conventional way and is therefore not shown. It creates an air flow sweeping over the cylinder crankshaft and muffler. A baffle can be arranged to direct this air flow in an essentially sideways, i.e. along the crankshaft, direction. A holding and supply unit 162 is attached by springs or resilient means to the drive unit to provide a good anti vibration for the operator. This unit comprises handles 126, 128, controls 130, 132, and supports 134, 136 on the underside of the unit 162 for allowing upright positioning of the power tool 100 on a flat ground surface. Further it comprises a fuel tank 188 and a holding and supply unit 162 attached by springs or resilient means to the drive unit to provide a good anti vibration for the operator. A cutter arm 148 is attached to the drive unit 104 in its inner end 148A and carries the tool unit 102 in its outer end 148B. The cutter arm 148 also holds an endless driving belt used to transmit the power from the drive unit 104 to the cutter disc 106 in a manner known per se.

The centre line 138 of the engine cylinder 114 coincides with the axis of rotation 140 of the crankshaft 118. As shown in FIG. 2, the engine cylinder 114 and the crankcase 120 are tilted forwards by a tilt angle α between the centre line 138 of the engine cylinder 114 and a base line perpendicular 142 being perpendicular to a base line 144 or base plane. In an embodiment of the present invention, the tilt angle α amounts to 15 degrees. The base plane 144 is the horizontal plane on which the front and rear supports 134 and 136 of the machine unit 104 are resting as shown in FIG. 1. It should be understood that the reference to the base line/plane 144 in order to describe the degree of tilt of the engine cylinder 114 and the crankcase 120 presupposes that the height of the supports 134 and 136 are moderate. If the front supports 134 would be much higher than the rear support 136, e.g., if the front support 134 would consist of long, unfoldable legs, while the rear support 136 is just a heel of no height or negligible height, the above definition of the tilt angle α does not provide true information about the degree of tilt of the engine cylinder 114 and crankcase 120 assembly. It should in this connection also be understood that the rear support 136 need not consist of a protrusion in the form of a heel or the like, but may as well consist of just a piece of the bottom of the machine unit 104, which contacts the ground or base plane 144. In various embodiments of the present invention, the angle α may vary between 5 degrees to 40 degrees, preferably the angle α is 7-30 degrees, and more preferably 10-25 degrees. Still more preferable the angle α is 10-20 degrees or 13-23 degrees.

Assuming that the axis of rotation 118 of the crankshaft is located at a level above the base plane 144, such that the level does not particularly deviate from what is normal practice in working machines of the present type, also a line 146, which extends between the axis of rotation 108 of the cutter disc 106 and the axis of rotation 118 of the crankshaft, can be used as a reference line for describing the degree of tilt of the engine 112. According to the invention, the angle β of inclination between the centre line 138 of the engine cylinder 114 and the said connection line 146 is larger than 45°, but smaller than 75°. Preferably the angle β is larger than 50° but smaller than 70°, and even more preferably larger than 52° but smaller than 65°, and still more preferably larger than 54° but smaller than 65°, and most preferably larger than 56° but smaller than 60°.

A front side 154 of the tilted engine 112 (the engine cylinder 114 and the crankcase 120) is approximately parallel with the inclined centre line 138 of the cylinder bore 116. The front side 154, in other words, is also inclined, such that it forms an angle of about 75 degrees to the horizontal plane. This creates a space between the engine 112 and the disc guard 108 that has the substantial shape of a triangle. This space, which is available in the longitudinal direction between the engine 112 and the tool unit 102, especially the disc guard 110, represented by the said conceived triangle, is due to the tilt of the engine 112. Also the available space in the cross direction is considerable.

As shown in FIG. 1, the muffler 124 is accommodated in the above discussed, approximately triangular space, and is designed such that it will substantially occupy this space. The resulting shape of the muffler, in a cross section of the muffler, corresponding to the central, longitudinal, vertical section of the machine, can also be described as the shape of a longitudinal section of a pear. A major part of a rear side 156 of the muffler is parallel with the front side 154 of the tilted engine 112. The bottom section of the muffler 124 widens forward as well as rearwards, including a bottom part 158 which extends rearwards partially under the crankcase 120. In this configuration, the muffler 124 is accommodated in a close and side by side relationship with the engine cylinder 114, i.e. not located above or below the engine cylinder.

The muffler 124 and the engine cylinder 114 are placed in a close and side by side relationship. An inlet 160 is provided in a rear side 156 of the muffler 124, in "the tip of the pear", facing an exhaust port 162 of the engine cylinder 114. This is a convenient location of the inlet 160, as the exhaust gases are directed down into a voluminous body of the muffler 124. The exhaust gas leaves the muffler 124 through an outlet pipe in the bottom, left part of the muffler 124.

The pear-like shape of the muffler 124 in the section shown in FIG. 1 also means that the contour of the muffler 124 in said cross section has a point of balance (centre of gravity) in the main bottom part of the muffler 124, i.e. at a fairly low level. As a matter of fact, the point of balance of the muffler 124 will adopt a position well below the level of the axis of rotation 118 of the crankshaft, and even below the entire crankcase 120, when the power tool 100 is in an upright position. This feature indicates that the muffler 124 indeed is located at a level in the power tool 100 which is unconventionally low.

Moreover, the assembly 122 for the supply of air and fuel mixture to the engine 112 is accommodated in a space, between the fuel tank 182 and the filter system. The assembly 122 includes a carburetor 168 and an intake pipe 170 extending between the carburetor and an induction port 172 of the engine cylinder 114. The engine 112, according to the preferred embodiment, is a crankcase scavenged two-stroke internal combustion engine employing air head technique. Therefore, the engine cylinder 114 is provided with transfer ducts (not shown), which have ports in the engine's cylinder wall, and therefore the assembly 122 also includes an air inlet 174 equipped with a restriction valve 176 and two parallel connecting ducts 178 leading to connecting ports in the cylinder wall and via piston recesses to the transfer channels. So called reed valves could also be used. Additional air is therefore supplied to the transfer channels from the air inlet 174 via at least one connecting duct 178 located in the vicinity of the intake pipe 170. The tilted cylinder is an advantage considering the extra space available for filters and intake system.

The carburetor 168, which is of a conventional type including a gas valve and a choke valve, the air inlet 174 with the restriction valve 176, the intake pipe 170 and the connecting ducts 178 are assembled and mounted on a bracket 180. The bracket 180 in turn is mounted in a rear part of the space (between the fuel tank and the filter system), near a rear wall of the machine. Due to this and the because of a considerable longitudinal extension of the space between the fuel tank and the filter system 110, which is promoted by the inclination of the engine cylinder 114 allows the carburetor 168 to be located at a fairly large distance from the cylinder 144, and also allows the connecting ducts 178 to be fairly long. Both these features are important. A relatively "cold" location of the carburetor 168 at quite a distance from the hot cylinder promotes good hot restart performance of the engine, and long connecting ducts 178 promote a proper functioning of the air-head technique. Also it is an advantage that the flexible intake duct 170 and the flexible connecting ducts 178, normally made of rubber or similar, are long as they connect a vibrating, moving drive unit 104 with a more stable, anti vibrated, holding and supply unit 166.

The filter system can include a pre-filter provided in an upper filter chamber and always a main filter 184 provided under the rear part of the pre-filter and enclosed in a lower filter chamber defined by the pre-filter, a frame 186 which extends downwards from a bottom part of the pre-filter, and a horizontal part of the bracket 180. The upper and lower filter chambers communicate via a passage 190 through the bottom part of the pre-filter.

The cutter arm 148 is fastened with its inner end 148A to the crankcase 120. Inside the cutter arm (not shown) there is a drive belt that drives a tool shaft, with an axis of rotation 108. The tool shaft and a tool guard 110 are both attached to an outer end 148B of the cutter arm in a conventional way. Normally cutting blades of 200-400 mm diameter are used. Of course these blades are heavy, up to about 3 kg, and are rotated at speeds up to about 4500 revolutions per minute, i.e. approximately half the engine speed. Some power cutters instead have two smaller blades, e.g. Husqvarna K760 Cut-n-break. This type of power cutter layout with a forward leaning cylinder has many advantages. A lot of space is created behind the cylinder for air cleaning. The power cutter is still kept very compact and short. A strong reason for this is a very special arrangement of the muffler 124 or 302, see FIG. 1-6. The muffler is arranged in a very low position where it does shorten the distance between the tool guard 110 and the most forward part of the engine cylinder 114. Therefore the cutter arm 148 is shortened. This lowers the bending stresses in the cutterarm and raises the resonance frequency for bending, while maintaining a low weight for the cutter arm and the whole power cutter. All this is very important. As demonstrated in FIG. 1 the muffler 124, 302 is essentially accommodated in a space which has the substantial shape of a triangle in a cross section of said space perpendicular to the crankshaft axis of rotation 118 and located behind the tool guard 110, which triangle has one corner pointing upwards when the power cutter has an upright position, a front side 164 facing the tool unit 102, a base side 166 facing a base line 144 and a rear side 154, that is also a front side of the engine cylinder. By comparing FIG. 2, that is an enlarged scale part figure of FIG. 1, and FIG. 3-6 it is clear that the mufflers 302 in the latter figures do equally well fit into this triangle with sides 164, 166 and 154 as shown in FIG. 1. Therefore these mufflers could be used in this kind of favourable layout with a forward leaning cylinder.

FIG. 3-6 show a special muffler 302 that is also arranged essentially within a triangle with sides 164, 166 and 154. This muffler has an improved cooling of gases entering the muffler through a strongly cooled intake pipe 316. Also the exhaust 310 and exhaust duct of the engine cylinder 114 is especially strongly cooled. This is important as engine seizures often start through high temperatures in this critical part of the cylinder. The improved cooling is evident by comparing FIG. 3-6 with FIG. 2. The FIG. 1-2 design has a muffler 124 that blocks cooling air from the fan from flowing past the exhaust port area, giving it a reduced cooling compared to the FIG. 3-6 designs. Further inside the muffler of FIG. 1-2 there could be an internal pipe or a baffle that divides the interior muffler volume to decrease sound. Such a pipe or baffle is only cooled by exhaust gases inside the muffler, having a temperature of say 400-1000 degrees Celsius. In contrast to this the external pipe 316 is cooled by cooling air from the fan having a temperature of may be 20-30 degrees Celsius.

A further advantage is that the pipe 316 provides a more flexible top attachment of the muffler 304. This also makes it possible to make a second and possibly third attachment/support of the muffler more flexible. Hereby the engine vibration, i.e. the drive unit 104 vibration, can be altered. This will also provide a positive effect for the cutter arm stresses.

The top of the engine cylinder 114 is covered by a cap 148 for directing cooling air to the cooling fins 166 of the engine cylinder 114. A front part of the cap 148 and a section of the engine cylinder 114 beneath the cap 148 face the tool unit 102 at a moderate distance from the disc guard 108. The spark plug 150 of the engine 112 extends through a hole 148A in the top of the cap and is pointing obliquely up in the very front top corner 152 of the machine unit 104, where the top and the front side of the machine unit 104 meet, covered by a cupola-like elevation in the front part of a filter bottom, included in the filter system.

As described in FIG. 1 and FIG. 2, the tilted engine cylinder configuration results in a compact arrangement of the power tool 100, however, the exhaust port 162 and the inlet 160 of the muffler 124 are placed very closely. During operation, the hot exhaust gases from the exhaust port 162, due to very high temperature, may transfer heat to the inlet 160. Further, after operation a lot of heat is transferred back from the inlet 160 to the exhaust port 162 and increases the temperature at the exhaust port 162 of the engine cylinder 114. This causes the exhaust port 162 of the engine cylinder 114 to attain exceptionally high temperatures during continued operation and immediately after the operation of the power cutter 100. Such high temperatures may be detrimental to the longevity of the internal combustion engine 112 and the power cutter 100. Moreover, due to the compact arrangement of the muffler 124 and the engine cylinder 114, at the inlet 160, it is less feasible to provide a localized cooling in this area by allowing the flow of cooling air.

According to various embodiments of the present invention, wherein an exhaust gas inlet is provided on a substantially top or bottom or a local side or the muffler in a variety of power cutters, the muffler is arranged to be in communication with the exhaust port of the cylinder by means of a pipe for improving an air flow around the pipe and around the exhaust port of the engine cylinder. This provides an improved localized cooling in the area around the pipe and around the exhaust port of the engine cylinder, to lower the temperature of the exhaust port of the engine cylinder and the exhaust gases entering the exhaust gas inlet of the muffler. The invention further described below in conjunction with FIGS. 3 to 7 showing various exemplary embodiments.

Figure 3:
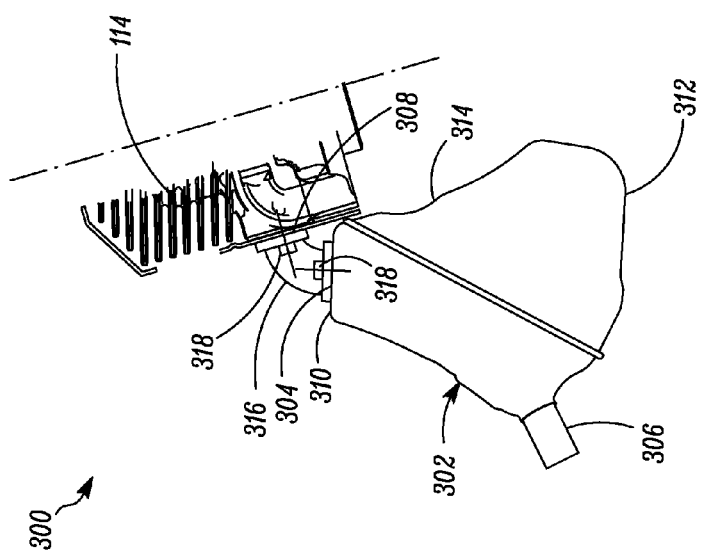
FIG. 3 shows a muffler and a cylinder-muffler arrangement according to an embodiment of the present invention.

FIGS. 3 to 6 show various cylinder-muffler arrangements 300 in a power cutter, according to various embodiments of the present invention. As shown in FIG. 3, the cylinder-muffler arrangement 300 includes a muffler 302 placed in a side by side relationship with the engine cylinder 114. The muffler 302 includes an exhaust gas inlet 304 and an exhaust gas outlet 306, such that the exhaust gas inlet 306 is adapted to receive the exhaust gases from an exhaust port 308 of the engine cylinder 114. As shown in FIG. 3, the exhaust gas inlet 304 is provided on a substantially top side 310 of the muffler 302, but in various other embodiments of the present invention, the exhaust gas inlet 304 may be provided on a bottom side 312 or a local side 804, 808, 812 of the muffler 302, without departing from the essence of the invention. Further, the muffler 302 may include a catalytic converter in a manner known per se.

Figure 4:
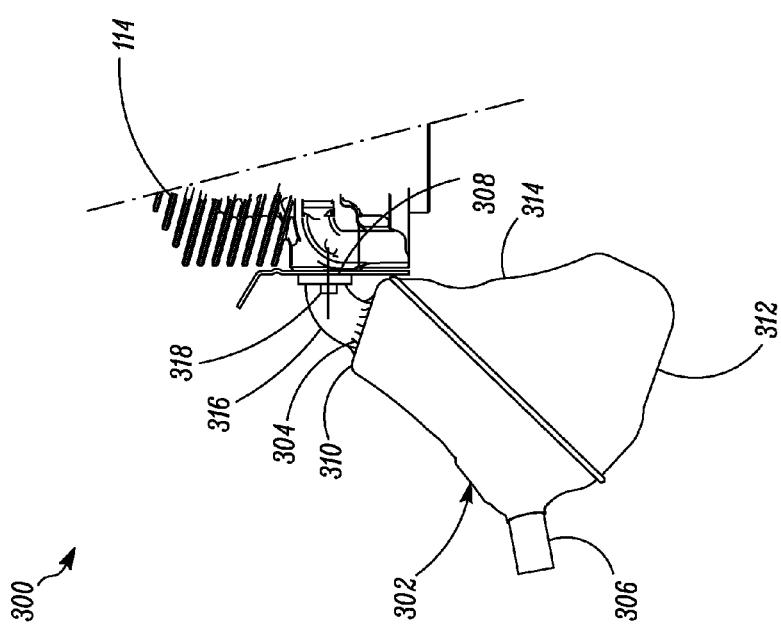
FIG. 4 shows the muffler and the cylinder-muffler arrangement according to another embodiment of the present invention.
Figure 5:
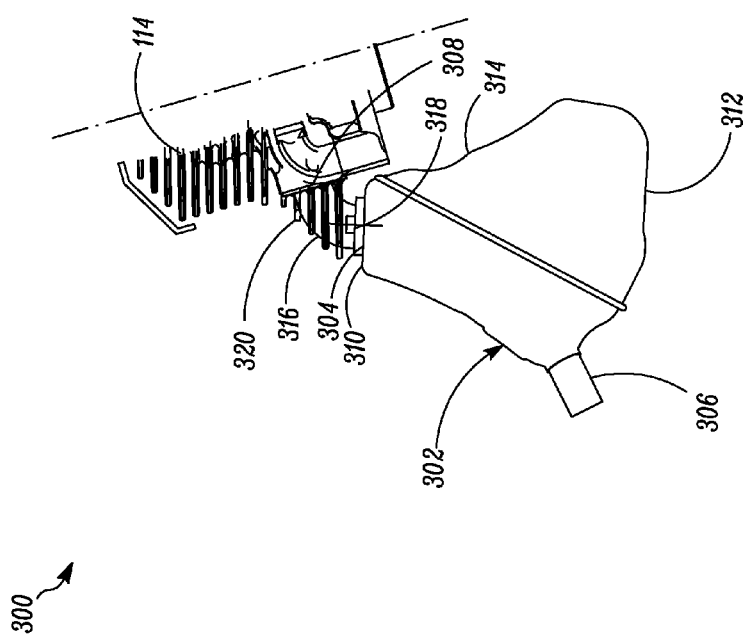
FIG. 5 shows the muffler and the cylinder-muffler arrangement according to a yet another embodiment of the present invention.

According to the present invention, the exhaust gas inlet 304 of the muffler 302 is in communication with the exhaust port 308 of the engine cylinder 114 by means of a pipe 316. The pipe 316 is attached to both the exhaust port 308 and the exhaust gas inlet 304 by means of fasteners 318, as showed in FIG. 3. In an alternate embodiment, as shown in FIG. 4, the pipe 316 may be welded to the exhaust gas inlet 304 and attached to the exhaust port 308 by means of the fasteners 318. Alternately the pipe 316 may be welded to the exhaust port 308 and attached to the exhaust gas inlet 304 by means of the fasteners 318. Further, the pipe 316 may be welded to both the exhaust port 308 and the exhaust gas inlet 304. Alternately, the pipe 316 may be integrated to the inlet 304 and attached to the exhaust port 308 by means of fasteners 318 or by means of welding. The pipe 316 may further be integrated to the exhaust port 308 and attached to the exhaust gas inlet 304 by means of fasteners 318 or by means of welding, as shown is FIG. 5. Normally the muffler should be easily demountable, with or without pipe 316. Therefore it is preferable to use fasteners in either or both ends of the pipe.

Figure 6:
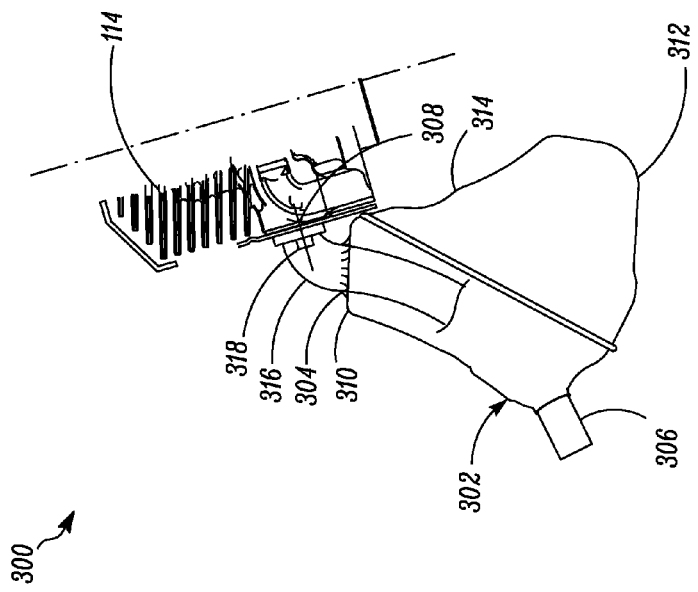
FIG. 6 shows the muffler and the cylinder-muffler arrangement according to a yet another embodiment of the present invention.

In an embodiment of the present invention the pipe 316 terminates at the exhaust gas inlet 304. In an alternate embodiment, as shown in FIG. 6, the pipe 316 may be extended to proceed inside the muffler 302. The cylinder-muffler as described in FIGS. 3 to 6 facilitate the transfer of heat from the exhaust gases to the surroundings. The enhanced air flow around the exhaust port 308 and the pipe 316 results in efficient heat transfer to the ambient cooling air. Further, the exhaust port 308 is exposed to the ambient, which enables direct heat transfer from the exhaust port 308 to the ambient cooling air. Providing the pipe 316 between the exhaust port 308 and the exhaust gas inlet 304 also facilitates the transfer of heat from the surface of the pipe 316 to the ambient cooling air. Thus the exhaust gases cool down considerably before entering the muffler 302. Moreover, the efficiently cooled pipe 316 separates the inlet 304 from the exhaust port 308, such that heat from the inlet 304 may not be transferred as easily back to the exhaust port 308. The described cylinder-muffler configuration ensures that the temperature of the exhaust port 308 may not rise to exceptionally high levels. The transfer of heat from exhaust gases may be further enhanced by providing cooling fins 320 (shown in FIG. 5) on the surface of the pipe 316. In an embodiment, a baffle may be provided close to the muffler 302 so it can direct air flow in a direction essentially parallel with the crankshaft over the pipe 316, muffler 302 and cylinder 114, to improve cooling. Such baffle/s could be arranged to run in an essentially parallel direction with the crankshaft 118 above the muffler. It/they could be fastened to the muffler and/or to the cylinder 114 and/or to the tool guard 110.

Figure 7:
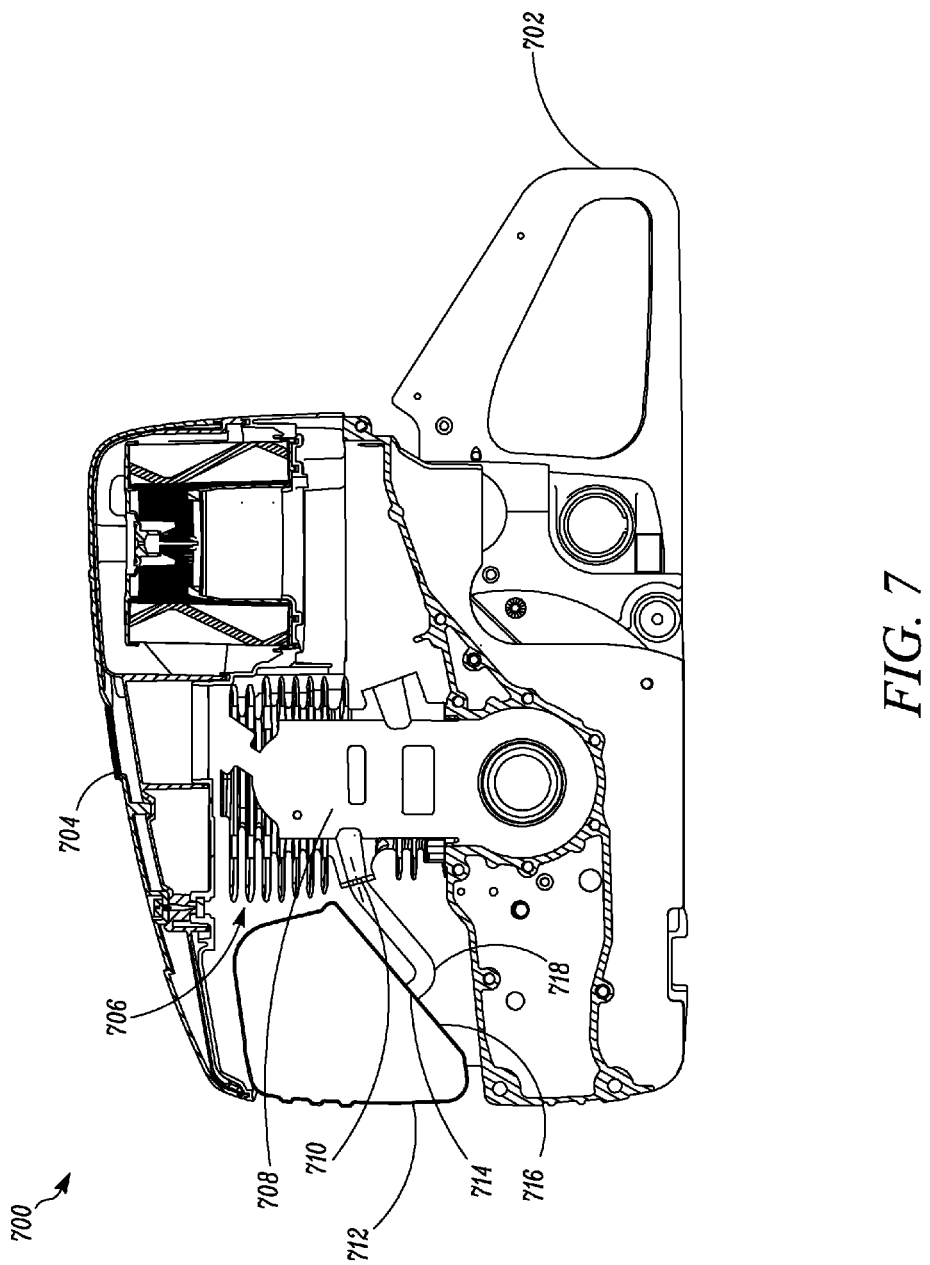
FIG. 7 shows another exemplary power tool and the cylinder-muffler arrangement according to an embodiment of the present invention.

FIG. 7 shows a power tool 700, according to an embodiment of the present invention. The power cutter 700 includes a handle 702, a housing 704, an engine 706 having a cylinder 708. The cutter arm has not been shown. The cylinder 708 may be provided with an inlet for admitting a mixture of air and fuel via an assembly for delivering air and fuel to the cylinder 708. The cylinder 708 includes an exhaust port 710. The power cutter 700 further includes a muffler 712 having an exhaust gas inlet 714. The inlet 714 is disposed on a bottom surface 716 of the muffler 712. A pipe 718 is disposed between the exhaust port 710 and the inlet 714. The embodiment illustrated in FIG. 7 attains similar operating characteristics as those described in connection with FIG. 3 to FIG. 6.

FIGS. 8A to 8C show various cylinder-muffler arrangements 800 in a power cutter, according to various other embodiments of the present invention. The cylinder-muffler arrangement 800 includes a mirrored 'C' shaped muffler 801. As shown in FIGS. 8A, 8B and 8C, the muffler 801 includes a top side 802, a local top side 804, a bottom side 806, a local bottom side 808, a lateral side 810 and a local lateral side 812. Further, the muffler 801 includes an exhaust gas inlet 814 and an exhaust gas outlet (not shown), such that the exhaust gas inlet 814 is adapted to receive the exhaust gases from the exhaust port of the engine cylinder.

According to an embodiment of the present invention, as shown in FIG. 8A, the exhaust gas inlet 814 is provided on the local top side 804 of the muffler 801. Moreover, the exhaust gas inlet 814 of the muffler 801 is in communication with the exhaust port 816 of the engine cylinder (now shown) by means of a pipe 818. As described above, in context with FIG. 3, the pipe 818 may be attached to both the exhaust port 816 and the exhaust gas inlet 814 by means of for example, but not limited to, fasteners, welding. Alternatively, the pipe 818 may be integral with the exhaust port 816 and/or the exhaust gas inlet 814.

According to other embodiments of the present invention, as shown in FIGS. 8B and 8C, the exhaust gas inlet 814 may be provided on the local lateral side 812 or the local bottom side 808 of the muffler 801 respectively. A preferred way of attaching the pipe 818 to the muffler 801 is by welding and attach to the cylinder by screwing.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A portable, hand held power cutter comprising:
   a tool unit having at least one working tool, which can be rotated about an axis of rotation, and preferably having a tool guard;
   a drive unit comprising a single cylinder internal combustion engine, the engine comprising a single engine cylinder with cylinder bore having a center line, a sidewall, and a top and an exhaust port formed in the sidewall of the engine cylinder, a crankshaft, a crankcase and an assembly for supplying air and fuel to the engine, wherein a piston is configured to close the exhaust port when the piston is adjacent and covering the exhaust port and to open the exhaust port when the piston is below the exhaust port;
   a cutter arm attached to the drive unit in its inner end and its outer end carrying the tool unit; and
   a muffler accommodated in a close and side by side relationship with the engine cylinder;
the muffler comprises an exhaust gas inlet and an exhaust gas outlet, such that the exhaust gas inlet is adapted to receive the exhaust gases from the exhaust port of the engine cylinder;
   the exhaust gas inlet is provided on a substantially top or bottom or a local side of the muffler;
   the muffler is arranged to be in communication with the exhaust port of the engine cylinder by means of a pipe for improving an air flow around the pipe and around the exhaust port of the engine cylinder to thereby lower the temperature of the exhaust port of the engine cylinder and the exhaust gases entering the exhaust gas inlet of the muffler.

2. The power cutter according to claim 1, wherein the cylinder bore is inclined in a forward direction towards the tool unit, such that the center line of the cylinder bore forms a tilt angle larger than zero to a base line perpendicular being perpendicular to a base line which is a line coinciding with a horizontal surface on which the power tool is resting in an upright position.

3. The power cutter according to claim 2, wherein the tilt angle is between about 5 degrees to 40 degrees.

4. The power cutter according to claim 1, wherein the muffler accommodated in side by side relationship with the engine cylinder is accommodated in a space provided between the tool unit and the engine cylinder.

5. The power cutter according to claim 1, wherein the pipe is integrated with the exhaust gas inlet of the muffler and is fastened to the exhaust port of the engine cylinder by means of one or more fasteners or by means of welding.

6. The power cutter according to claim 1, wherein the pipe is integrated with the exhaust port of the engine cylinder and is fastened to the exhaust gas inlet of the muffler by means of one or more fasteners or by means of welding.

7. The power cutter according to claim 1, wherein the pipe is fastened to the exhaust port of the engine cylinder and to the exhaust gas inlet of the muffler by means of one or more fasteners or by means of welding.

8. The power cutter according to claim 1, wherein the pipe is extended to proceed inside the muffler.

9. The power cutter according to claim 1, wherein the pipe comprises a fin structure provided on an outer side of the pipe.

10. The power cutter according to claim 1, wherein a baffle is arranged above or below the muffler to direct air flow in an essentially sideways direction over the pipe to improve cooling.

11. The power cutter according to claim 1, wherein the muffler comprises a catalytic converter.

12. The power cutter according to claim 1, wherein the power cutter is driven by a two stroke engine.

13. The power cutter according to claim 12, wherein the two stroke engine is provided with additional air from an air inlet.

14. The power cutter according to claim 1, wherein the muffler is essentially accommodated in a space which has the substantial shape of a triangle in a cross section of said space perpendicular to the crankshaft axis of rotation and located behind the tool guard, which triangle has one corner pointing upwards when the power cutter has an upright position, a front side facing the tool unit, a base side facing a base line and a rear side, that is also a front side of the engine cylinder.

15. The power cutter according to claim 1, wherein the exhaust gas inlet is provided on a substantially top side of the muffler.

16. The power cutter according to claim 1, wherein a connection line, which extends between the axis of rotation of the cutter disc and the axis of rotation of the crankshaft, forms a cylinder angle with the cylinder bore centerline, and this cylinder angle is larger than 45°, but smaller than 75°.

17. The power cutter according to claim 2, wherein the tilt angle is between about 5 degrees to 30 degrees.

18. The power cutter according to claim 2, wherein the tilt angle is between about 10 degrees to 20 degrees.

19. The power cutter of claim 16, wherein the cylinder angle is larger than 50° but smaller than 70°.

20. The power cutter of claim 16, wherein the cylinder angle is larger than 52° but smaller than 65°.

* * * * *